United States Patent
Chen (10) Patent No.: US 10,690,954 B2
(45) Date of Patent: Jun. 23, 2020

(54) LIQUID CRYSTAL DISPLAY DEVICE HAVING TRANSPARENT STACKED LAYER BETWEEN QUANTUM-DOT COLOR RESIST LAYER AND ENCAPSULATION LAYER

(71) Applicant: Shenzhen China Star Optoelectronics Technology Co., Ltd., Shenzhen (CN)

(72) Inventor: Lixuan Chen, Shenzhen (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 64 days.

(21) Appl. No.: 15/578,244

(22) PCT Filed: Jul. 13, 2017

(86) PCT No.: PCT/CN2017/092851
§ 371 (c)(1),
(2) Date: Nov. 30, 2017

(87) PCT Pub. No.: WO2018/227679
PCT Pub. Date: Dec. 20, 2018

(65) Prior Publication Data
US 2018/0356688 A1    Dec. 13, 2018

(30) Foreign Application Priority Data
Jun. 13, 2017   (CN) .......................... 2017 1 0444253

(51) Int. Cl.
*G02F 1/1335*    (2006.01)
*G02F 1/13357*    (2006.01)
(Continued)

(52) U.S. Cl.
CPC .. *G02F 1/133514* (2013.01); *G02F 1/133512* (2013.01); *G02F 1/133617* (2013.01);
(Continued)

(58) Field of Classification Search
CPC .......... G02F 2001/01791; G02F 2001/133614; G02F 1/133512; G02F 1/133514;
(Continued)

(56) References Cited

U.S. PATENT DOCUMENTS 10,185,066 B2 *   1/2019   Chae ...................... G02B 5/207
2006/0291188 A1   12/2006   Nakayama
(Continued)

FOREIGN PATENT DOCUMENTS

CN    104460103 A    3/2015
CN    105204221 A    12/2015
(Continued)

*Primary Examiner* — Paisley L Wilson
(74) *Attorney, Agent, or Firm* — Leong C. Lei (57) ABSTRACT

An LCD device is provided. The liquid crystal panel thereof includes first and second substrates (opposite each other). The first substrate sequentially includes a first underlay-substrate, a quantum-dot color filter, and an encapsulation layer. The quantum-dot color filter includes a pixel separation layer and several color resist units which are separated by the pixel separation layer, and include first, second and third color resist units, where at least one is a quantum-dot color resist unit. There is a transparent stacked layer between the quantum-dot color resist unit and the encapsulation layer in the quantum-dot color filter, thus the quantum-dot color resist unit has a higher standing point than the pixel separation layer on the encapsulation layer. The phenomenon of the brightening and color deviation of the black screen of the liquid crystal display device at the time of a large viewing-angle displaying can be prevented to enhance display effect.

13 Claims, 4 Drawing Sheets

(51) Int. Cl.
　　　*G02F 1/017*　　　(2006.01)
　　　*G02F 1/1333*　　(2006.01)
(52) U.S. Cl.
　　　CPC .................. *G02F 1/133502* (2013.01); *G02F 2001/01791* (2013.01); *G02F 2001/133357* (2013.01); *G02F 2001/133519* (2013.01); *G02F 2001/133614* (2013.01)
(58) Field of Classification Search
　　　CPC ........ G02F 2001/133519; G02F 2001/133357; H01L 31/035218
　　　See application file for complete search history.

(56) References Cited

U.S. PATENT DOCUMENTS

2017/0059940 A1\* 3/2017 Kim .................. G02F 1/133617
2018/0224701 A1\* 8/2018 Shin .................. G02F 1/133617

FOREIGN PATENT DOCUMENTS

| CN | 106324893 A | 1/2017 |
| CN | 106773328 A | 5/2017 |
| CN | 107092125 A | 8/2017 |

\* cited by examiner

LIQUID CRYSTAL DISPLAY DEVICE HAVING TRANSPARENT STACKED LAYER BETWEEN QUANTUM-DOT COLOR RESIST LAYER AND ENCAPSULATION LAYER

BACKGROUND OF THE INVENTION

1. Field of the Invention

The present disclosure relates to a field of display technology, and more specifically to a liquid crystal display device.

2. Description of the Prior Art

With the development of science and technology and the progress of the society, people's dependence degrees for information exchange, delivery, and the like are higher and higher. Display devices are used as main carriers and material bases for information exchange and delivery. The Display devices have become a hotspot and highland seized by numerous scientists which are pursuing information photoelectric researches.

Quantum dots (QD) are invisible semiconductor nanocrystal having very small volume, of which are three dimension nano material that most is composed by II-VI elements or III-V elements. Because of the quantum confinement effect, the transportation of the inner electrons and holes are restricted to make the continuous energy band structure become the disjunct level structure. The quantum dots emit colorful light beams when being excited by an external energy such as light, electricity, or the like. The color of the light beams is determined by the material, volume, and shape of the quantum dots. When the dimensions of the quantum dots are different, the confinement degrees of the electrons and the holes are different and the disjunct level structures are different. In general, a long wavelength can be absorbed when the particle size thereof is smaller, and a short wavelength can be absorbed when the particle size thereof is bigger. Generally, blue light having a short wavelength can be absorbed by the quantum dots to excite color light having a long wavelength. Thus, the color of the light beams of the quantum dots may be changed by altering the light source.

The advantages of the quantum dots are: by controlling the dimensions of the quantum dots, the achievable light emitting wavelength range can cover the infrared ray to the entire visible light band. The light emitting band is narrow, and the color saturation is high; the quantum conversion efficiency of the quantum-dot material is high; the material property is stable; the manufacture method is simple but varied. It can be manufactured by solution and the resource is very much.

The color display of an existing liquid crystal display (LCD) is achieved by a color filter (CF) layer. A traditional CF layer is formed by a series of yellow-light processes with color resist materials. Each color resist material is formed by dissolving and dispersing a polymer, a monomer, a photo initiator, and a pigment into a solvent. In recent years, corporations such as Samsung Electronics Co. and the like propose that a quantum-dot color filter (QDCF) is manufactured by a quantum-dot material to replace a traditional color filter.

Figure 1:
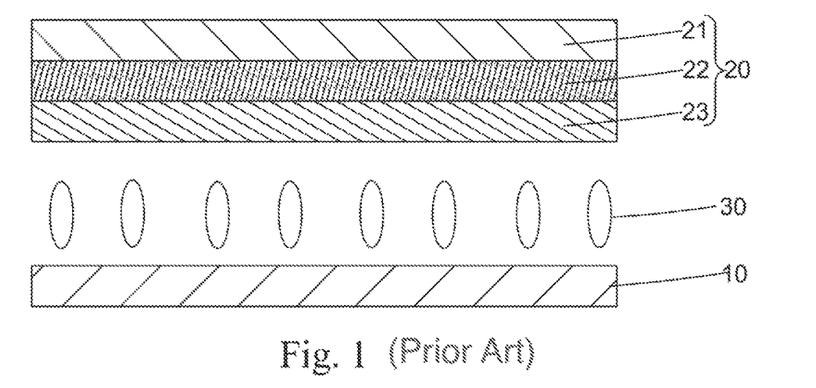
FIG. 1 is a schematic view of a structure of an existing liquid crystal display panel.
Figure 2:
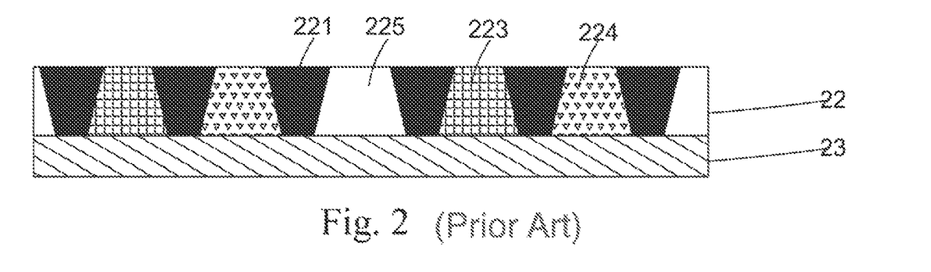
FIG. 2 is a schematic view of the quantum-dot color filter and the encapsulation layer of FIG. 1.
Figure 3:
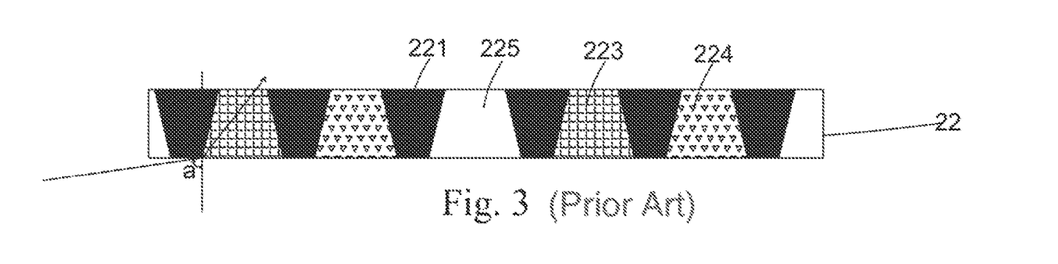
FIG. 3 is a schematic view of a light path of irradiating through the quantum-dot color filter of FIG. 2.

An existing QDCF is manufactured by a quantum-dot nano material, and that needs the combination of a series of solvents and ligands, industries have been made some progress on that. For example, a color filter manufactured by using the quantum dots has been disclosed by some current invention patents. As shown in FIG. 1, an existing liquid crystal display panel containing the QDCF includes an array substrate 10, a color filter substrate 20 opposite the array substrate 10, and a liquid crystal layer 30 sandwiched between the array substrate 10 and the color filter substrate 20. The color filter substrate 20 includes an underlay-substrate 21, a quantum-dot color filter 22, and an encapsulation layer 23. The quantum-dot color filter 22 and the encapsulation layer 23 are sequentially disposed on the surface of the underlay-substrate 21 where is near the array substrate 10. The quantum-dot color filter 22 includes a pixel separation layer 221, a red color resist unit 223, a green color resist unit 224, and a blue color resist unit 225. The pixel separation layer 221 separates the red color resist unit 223, the green color resist unit 224, and the blue color resist unit 225. As shown in FIG. 2, the red color resist unit 223 and the green color resist unit 224 are formed by an ink-jet printing process with a red quantum-dot ink material and a green quantum-dot ink material, respectively. The blue color resist unit 225 can be formed by filling a transparent organic material. Blue light emitted by the blue color resist unit 225 can be provided by a backlight module producing blue fluorescent light. In the light path of the liquid crystal display panel, the actual optical paths of vertical incident light and oblique incident light irradiating through the liquid crystal layer 30 are different. As shown in FIG. 3, when the pixel separation layer 221, the red color resist unit 223 containing the quantum-dot material, and the green color resist unit 224 containing the quantum-dot material have the same standing point on the encapsulation layer 23, almost all of lights can incident on the red color resist unit 223 containing the quantum-dot material and the green color resist unit 224 containing the quantum-dot material, and the maximum incident angle a thereof is near 90 degrees. Therefore, from a positive perspective, even if it shows a black screen which the lightness thereof is as low as 0.05 nits under a black screen signal, changes of polarization will likely be produced in a squint direction because of the deviation of the light path thereof, thereby the quantum-dot material is excited since the light leak of viewing angles, so that the phenomenon of the brightening and color deviation of the black screen of the liquid crystal display device at the time of a large viewing-angle displaying occurs.

In view of the above-described problems, there is a need to provide a liquid crystal display device having a new structure.

SUMMARY OF THE INVENTION

An object of the present disclosure is to provide a liquid crystal display device. The phenomenon of the brightening and color deviation of the black screen of the liquid crystal display device at the time of a large viewing-angle displaying can be prevented to enhance the display effect thereof.

To achieve the above object, the present disclosure provides a liquid crystal display device. The liquid crystal display device includes a liquid crystal panel and a backlight module disposed under the liquid crystal panel, in which the liquid crystal panel includes a first substrate, a second substrate, and a liquid crystal layer sandwiched between the first substrate and the second substrate, the first substrate and the second substrate are correspondingly arranged and opposite to each other;

the first substrate includes a first underlay-substrate, a quantum-dot color filter, and an encapsulation layer, and the quantum-dot color filter and the encapsulation layer are sequentially disposed on the surface of the first underlay-substrate where is near the liquid crystal layer from top to bottom;

the quantum-dot color filter includes a pixel separation layer and a plurality of color resist units which are arranged in an array, and the pixel separation layer separates the color resist units;

the color resist units include a first color resist unit, a second color resist unit, and a third color resist unit;

at least one of the first color resist unit, the second color resist unit, and the third color resist unit is a quantum-dot color resist unit, and a transparent stacked layer is further sandwiched between the quantum-dot color resist unit and the encapsulation layer in the quantum-dot color filter, thus the quantum-dot color resist unit has a higher standing point than the pixel separation layer on the encapsulation layer.

The pixel separation layer and the transparent stacked layer are disposed on the surface of the encapsulation layer.

The sum of the height of the quantum-dot color resist unit and the height of the transparent stacked layer is less than or equal to the height of the pixel separation layer.

Two of the first color resist unit, the second color resist unit, and the third color resist unit are the quantum-dot color resist unit. That is, the first color resist unit is a red quantum-dot color resist unit, the second color resist unit is a green quantum-dot color resist unit, and the third color resist unit is a blue color resist unit.

The backlight module is a blue fluorescent light source.

The red quantum-dot color resist unit and the green quantum-dot color resist unit are formed by an ink-jet printing process with a red quantum-dot ink material and a green quantum-dot ink material, respectively. The blue color resist unit is formed by a transparent organic material.

The first substrate further includes an optical film layer sandwiched between the first underlay-substrate and the quantum-dot color filter, and the optical film layer has filtering functions.

The optical film layer is formed by a patterning process, and the optical film layer is used for removing an unconverted back light which is formed by a light emitted by the backlight module irradiating through the quantum-dot color resist unit.

The first substrate further includes an upper polarizing sheet which is disposed on the surface of the encapsulation layer near the liquid crystal layer.

The first underlay-substrate is a glass substrate, a PI substrate, or a PET substrate.

The present disclosure also provides a liquid crystal display device. The liquid crystal display device includes a liquid crystal panel and a backlight module disposed under the liquid crystal panel, in which the liquid crystal panel includes a first substrate, a second substrate, and a liquid crystal layer sandwiched between the first substrate and the second substrate, the first substrate and the second substrate are correspondingly arranged and opposite to each other;

the first substrate includes a first underlay-substrate, a quantum-dot color filter, and an encapsulation layer, and the quantum-dot color filter and the encapsulation layer are sequentially disposed on the surface of the first underlay-substrate where is near the liquid crystal layer from top to bottom;

the quantum-dot color filter includes a pixel separation layer and a plurality of color resist units which are arranged in an array, and the pixel separation layer separates the color resist units;

the color resist units include a first color resist unit, a second color resist unit, and a third color resist unit;

at least one of the first color resist unit, the second color resist unit, and the third color resist unit is a quantum-dot color resist unit, and a transparent stacked layer is further sandwiched between the quantum-dot color resist unit and the encapsulation layer in the quantum-dot color filter, thus the quantum-dot color resist unit has a higher standing point than the pixel separation layer on the encapsulation layer;

the pixel separation layer and the transparent stacked layer are disposed on the surface of the encapsulation layer;

the sum of the height of the quantum-dot color resist unit and the height of the transparent stacked layer is less than or equal to the height of the pixel separation layer;

two of the first color resist unit, the second color resist unit, and the third color resist unit are the quantum-dot color resist unit, that is, the first color resist unit is a red quantum-dot color resist unit, the second color resist unit is a green quantum-dot color resist unit, and the third color resist unit is a blue color resist unit;

the first substrate further includes an optical film layer sandwiched between the first underlay-substrate and the quantum-dot color filter, and the optical film layer has filtering functions;

the optical film layer is formed by a patterning process, and the optical film layer is used for removing an unconverted back light which is formed by a light emitted by the backlight module irradiating through the quantum-dot color resist unit.

The present disclosure has the following beneficial effects. The liquid crystal panel in the liquid crystal display device of the present disclosure includes the first substrate, the second substrate, and the liquid crystal layer sandwiched between the first substrate and the second substrate. The first substrate and the second substrate are correspondingly arranged and opposite to each other. The first substrate includes the first underlay-substrate, the quantum-dot color filter, and the encapsulation layer. The quantum-dot color filter includes the pixel separation layer and the color resist units which are arranged in an array, and the pixel separation layer separates the color resist units. The color resist units include the first color resist unit, the second color resist unit, and the third color resist unit. At least one of the first color resist unit, the second color resist unit, and the third color resist unit is the quantum-dot color resist unit. The transparent stacked layer is further sandwiched between the quantum-dot color resist unit and the encapsulation layer in the quantum-dot color filter, thus the quantum-dot color resist unit has a higher standing point than the pixel separation layer on the encapsulation layer, thus the phenomenon of the brightening and color deviation of the black screen of the liquid crystal display device at the time of a large viewing-angle displaying can be prevented to enhance the display effect thereof.

BRIEF DESCRIPTION OF THE DRAWINGS

The technical solution, as well as beneficial advantages, of the present disclosure will be apparent from the following detailed description of an embodiment of the present disclosure, with reference to the attached drawings. In the drawings.

DETAILED DESCRIPTION OF THE PREFERRED EMBODIMENTS

To further expound the technical solution adopted in the present disclosure and the advantages thereof, a detailed description is given to a preferred embodiment of the present disclosure and the attached drawings.

Figure 4:
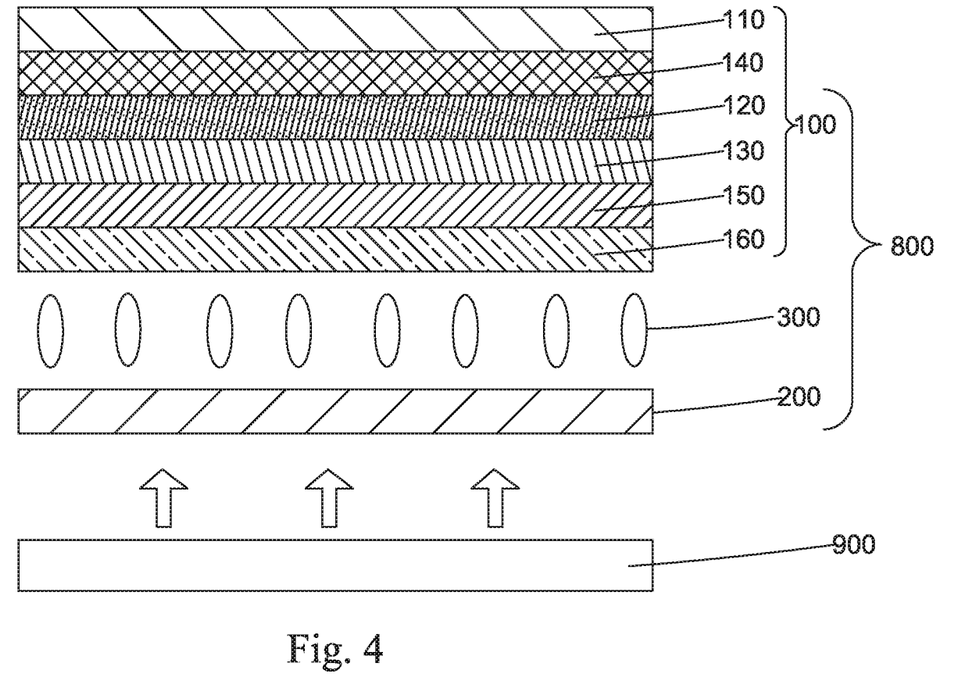
FIG. 4 is a schematic view of a structure of a liquid crystal display device according to the present disclosure.

Please refer to FIG. 4, the liquid crystal display device of the present disclosure includes a liquid crystal panel 800 and a backlight module 900 disposed under the liquid crystal panel 800. The liquid crystal panel 800 includes a first substrate 100, a second substrate 200, and a liquid crystal layer 300 sandwiched between the first substrate 100 and the second substrate 200. The first substrate 100 and the second substrate 200 are correspondingly arranged and opposite to each other.

The first substrate 100 includes a first underlay-substrate 110, a quantum-dot color filter 120, and an encapsulation layer 130. The quantum-dot color filter 120 and the encapsulation layer 130 are sequentially disposed on the surface of the first underlay-substrate 110 where is near the liquid crystal layer 300 from top to bottom. The quantum-dot color filter 120 is protected by the encapsulation layer 130, and the encapsulation layer 130 plays a role of planarization.

Figure 5:
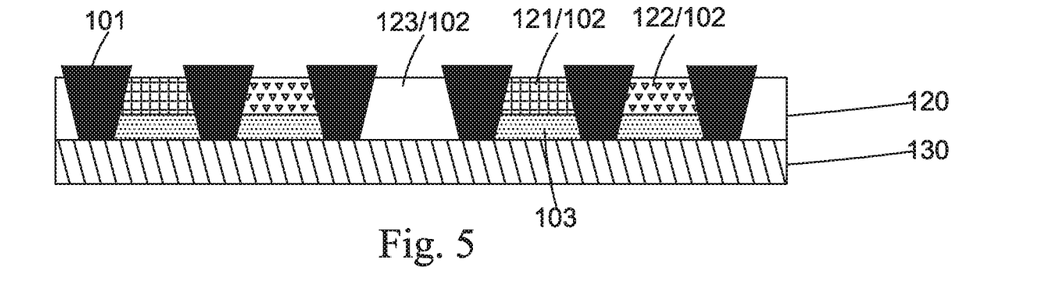
FIG. 5 is a schematic view of a quantum-dot color filter and an encapsulation layer in the liquid crystal display device according to the present disclosure.

As shown in FIG. 5, the quantum-dot color filter 120 includes a pixel separation layer 101 and a plurality of color resist units 102 which are arranged in an array, and the pixel separation layer 101 separates the color resist units 102.

The color resist units 102 include a first color resist unit 121, a second color resist unit 122, and a third color resist unit 123.

At least one of the first color resist unit 121, the second color resist unit 122, and the third color resist unit 123 is a quantum-dot color resist unit. A transparent stacked layer 103 is further sandwiched between the quantum-dot color resist unit and the encapsulation layer 130 in the quantum-dot color filter 120, thus the quantum-dot color resist unit has a higher standing point than the pixel separation layer 101 on the encapsulation layer 130.

Figure 6:
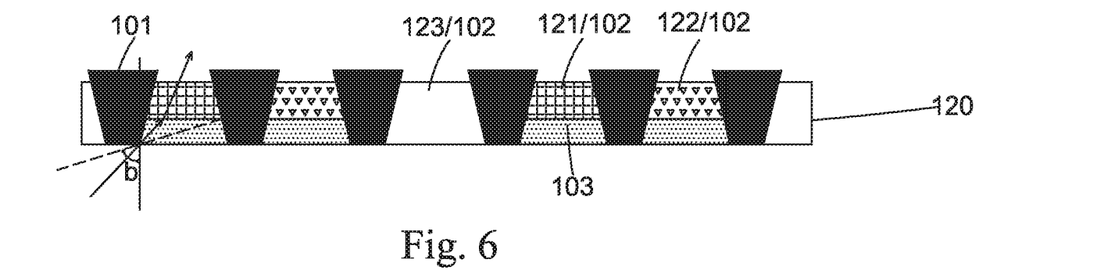
FIG. 6 is a schematic view of a light path of irradiating through the quantum-dot color filter of FIG. 5.

Specifically, as shown in FIG. 6, the quantum-dot color resist unit has a higher standing point than the pixel separation layer 101 on the encapsulation layer 130 by disposing the transparent stacked layer 103 between the quantum-dot color resist unit and the encapsulation layer 130. This is equivalent to raising the quantum-dot color resist unit on the encapsulation layer 130, so that the maximum incident angle b of a light, which can incident on the quantum-dot color resist unit and then excites quantum dots, is much less than the maximum incident angle a of the quantum-dot color resist unit and the pixel separation layer 101 which are on the same standing point, thus the phenomenon of the brightening and color deviation of the black screen of the liquid crystal display device at the time of a large viewing-angle displaying can be prevented to enhance the display effect thereof.

Specifically, the pixel separation layer 101 and the transparent stacked layer 103 are disposed on the encapsulation layer 130 at the same standing point. Further, the pixel separation layer 101 and the transparent stacked layer 103 are disposed on the surface of the encapsulation layer 130.

Specifically, the sum of the height h1 of the quantum-dot color resist unit and the height h2 of the transparent stacked layer 103 is less than or equal to the height h of the pixel separation layer 101.

Specifically, the first substrate 100 further includes an optical film layer 140 sandwiched between the first underlay-substrate 110 and the quantum-dot color filter 120, and the optical film layer 140 has filtering functions. The optical film layer 140 is used for removing an unconverted back light which is formed by a light emitted by the backlight module 900 irradiating through the quantum-dot color resist unit.

Specifically, the first substrate 100 further includes an upper polarizing sheet 150 which is disposed on the surface of the encapsulation layer 130 near the liquid crystal layer 300. That is, the light polarization state in the liquid crystal panel 800 is not changed by the quantum dots in the quantum-dot color filter 120 since an approach of in cell polarizer is employed.

Further, the first substrate 100 further includes a first electrode layer 160 which is disposed on the surface of the upper polarizing sheet 150 near the liquid crystal layer 300. The second substrate 200 is an array substrate. There are a TFT array (not shown in the figures) and a second electrode layer (not shown in the figures) on the second substrate 200.

Specifically, the first underlay-substrate 110 is a glass substrate, a PI substrate, or a PET substrate. Similarly, the second substrate 200 can also be an underlay-substrate which is a glass substrate, a PI substrate, or a PET substrate.

It should be noted that the material of the pixel separation layer 101 can select various materials including resin materials in accordance with requirements. The materials only needed to meet the shading condition of the present disclosure. Preferably, the transparent stacked layer 103 can be formed by soluble Polytetrafluoro ethylene (PFA).

Specifically, two of the first color resist unit 121, the second color resist unit 122, and the third color resist unit 123 are the quantum-dot color resist unit. That is, the first color resist unit 121 is a red quantum-dot color resist unit, the second color resist unit 122 is a green quantum-dot color resist unit, and the third color resist unit 123 is a blue color resist unit.

Specifically, the backlight module 900 is a blue fluorescent light source.

Specifically, the red quantum-dot color resist unit and the green quantum-dot color resist unit are formed by an ink-jet printing process with a red quantum-dot ink material and a green quantum-dot ink material, respectively. The blue color resist unit is formed by a transparent organic material. Red quantum dots (i.e., quantum dots emitting red light) and green quantum dots (i.e., quantum dots emitting green light) can be excited to produce red light and green light, respectively, since blue light has a higher energy. Therefore, the backlight module 900 producing blue fluorescent light can be used as a backlight source, and the blue light is provided by the backlight module 900, thus the blue color resist unit can be formed by filling the transparent organic material.

Specifically, the optical film layer 140 is formed by a patterning process. The optical film layer 140 is used for removing an unconverted blue fluorescent light which is formed by a light emitted by the backlight module 900 irradiating through the red quantum-dot color resist unit and the green quantum-dot color resist unit.

Figure 7:
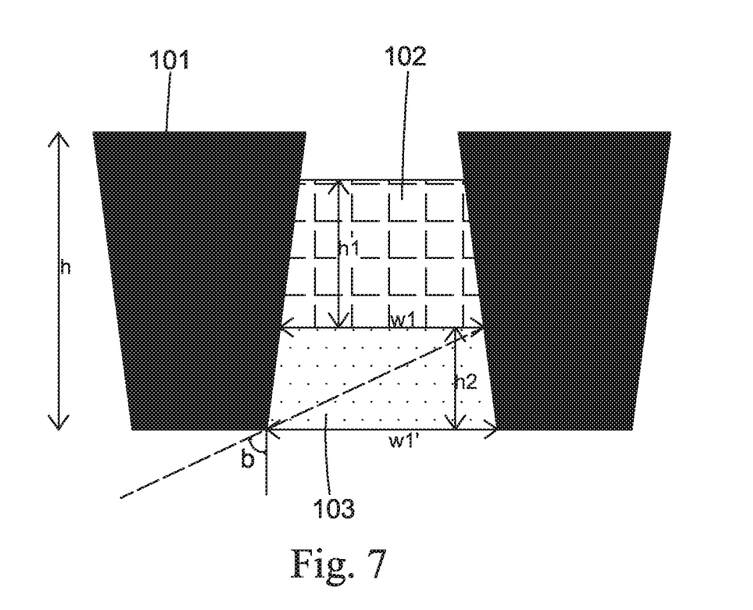
FIG. 7 is a sectional view of one quantum-dot color resist unit of the quantum-dot color filter in the liquid crystal display device of the present disclosure.
Figure 8:
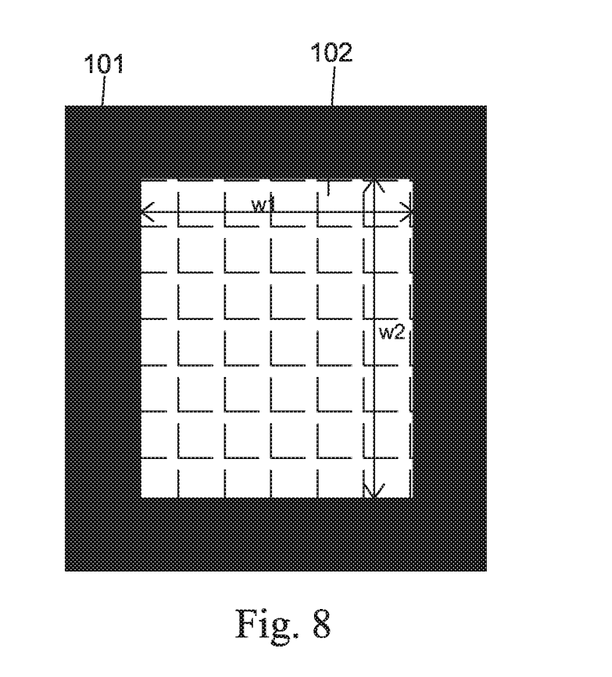
FIG. 8 is a top view of one quantum-dot color resist unit of the quantum-dot color filter in the liquid crystal display device of the present disclosure.

In the present disclosure, it should be noted that the maximum incident angle b of the light, which can incident on the quantum-dot color resist unit and then excites quantum dots, depends on the height and width of the transparent stacked layer 103, thus the height h2 of the transparent stacked layer 103 is pointedly designed in accordance with the actual light leak effect of the liquid crystal display device. As shown in FIGS. 7 and 8, in the transparent stacked layer 103, let it be assumed that the maximum width and minimum width of the short side thereof are w1' and w1, respectively; the maximum width and minimum width of the long side thereof are w2' and w2, respectively. Therefore, there is the following relationship between the maximum incident angle b of the short side of the transparent stacked layer 103 and the height and width of the transparent stacked layer 103:

$\tan b = ((w1'-w1)/2 + w1)/h2.$

Similarly, there is the following relationship between the maximum incident angle b' of the long side of the transparent stacked layer 103 and the height and width of the transparent stacked layer 103:

$\tan b' = ((w2'-w2)/2 + w2)/h2.$

From the above relationships, it can be observed that the higher the height h2 of the transparent stacked layer 103, the smaller the maximum incident angle of the light which can incident on the quantum-dot color resist unit and then excites quantum dots. For example, $((w1'-w1)/2+w1)/h2$ should be less than or equal to $\sqrt{3}$ (i.e., $h2 \geq ((w1'-w1)/2+w1)/\sqrt{3}$), so that the maximum incident angle b of the short side of the transparent stacked layer 103 is not greater than 60 degrees.

As mentioned above, the liquid crystal panel in the liquid crystal display device of the present disclosure includes the first substrate, the second substrate, and the liquid crystal layer sandwiched between the first substrate and the second substrate. The first substrate and the second substrate are correspondingly arranged and opposite to each other. The first substrate includes the first underlay-substrate, the quantum-dot color filter, and the encapsulation layer. The quantum-dot color filter includes the pixel separation layer and the color resist units which are arranged in an array, and the pixel separation layer separates the color resist units. The color resist units include the first color resist unit, the second color resist unit, and the third color resist unit. At least one of the first color resist unit, the second color resist unit, and the third color resist unit is the quantum-dot color resist unit. The transparent stacked layer is further sandwiched between the quantum-dot color resist unit and the encapsulation layer in the quantum-dot color filter, thus the quantum-dot color resist unit has a higher standing point than the pixel separation layer on the encapsulation layer, thus the phenomenon of the brightening and color deviation of the black screen of the liquid crystal display device at the time of a large viewing-angle displaying can be prevented to enhance the display effect thereof.

Based on the description given above, those having ordinary skills of the art may easily contemplate various changes and modifications of the technical solution and technical ideas of the present disclosure and all these changes and modifications are considered within the protection scope of right for the present disclosure.

What is claimed is:

1. A liquid crystal display device, comprising a liquid crystal panel and a backlight module disposed under the liquid crystal panel, wherein the liquid crystal panel comprises a first substrate, a second substrate, and a liquid crystal layer sandwiched between the first substrate and the second substrate, and the first substrate and the second substrate are correspondingly arranged and opposite to each other;

wherein the first substrate comprises a first underlay-substrate, a quantum-dot color filter, and an encapsulation layer, and the quantum-dot color filter and the encapsulation layer are sequentially disposed on a surface of the first underlay-substrate that is near the liquid crystal layer from top to bottom;

wherein the quantum-dot color filter comprises a pixel separation layer and a plurality of color resist units which are arranged in an array, and the pixel separation layer separates the color resist units;

wherein the color resist units comprise a first color resist unit, a second color resist unit, and a third color resist unit;

wherein at least one of the first color resist unit, the second color resist unit, and the third color resist unit is a quantum-dot color resist unit, and a transparent stacked layer is further sandwiched between the quantum-dot color resist unit and the encapsulation layer in the quantum-dot color filter, wherein a lower surface of the quantum-dot color resist unit is spaced farther away from the encapsulation layer than a lower surface of the pixel separation layer;

wherein the pixel separation layer and the transparent stacked layer are disposed on a surface of the encapsulation layer that defines a common plane to both the pixel separation layer and the transparent stacked layer, wherein the transparent stacked layer has a lower surface located on and in direct contact with the surface of the encapsulation layer, and the lower surface of the transparent stacked layer and the lower surface of the pixel separation layer are both on the common plane; and wherein a sum of a height of the quantum-dot color resist unit and a height of the transparent stacked layer is less than a height of the pixel separation layer, such that an upper surface of the pixel separation layer is spaced farther away from the surface of the encapsulation layer than an upper surface of the quantum-dot color resist unit, and wherein the pixel separation layer is made of a light-shading material that provides a light-shading surface around the quantum-dot color resist unit in such a way that the light-shading surface extends beyond the upper surface of the quantum-dot color resist unit in a direction away from the encapsulation layer, and the light-shading surface also extends beyond the lower surface of the quantum-dot color resist unit in a direction toward the encapsulation layer to circumferentially surround the transparent stacked layer that is stacked between the encapsulation layer and the quantum-dot color resist unit.

2. The liquid crystal display device of claim 1, wherein the at least one of the first color resist unit, the second color resist unit, and the third color resist unit that is a quantum-dot color resist unit comprises the first color resist unit that is a red quantum-dot color resist unit and the second color resist unit that is a green quantum-dot color resist unit, and wherein the third color resist unit is a blue color resist unit.

3. The liquid crystal display device of claim 2, wherein the backlight module is a blue fluorescent light source.

4. The liquid crystal display device of claim 3, wherein the red quantum-dot color resist unit and the green quantum-dot color resist unit are formed by an ink-jet printing process with a red quantum-dot ink material and a green quantum-dot ink material, respectively; the blue color resist unit is formed by a transparent organic material.

5. The liquid crystal display device of claim 1, wherein the first substrate further comprises an optical film layer sandwiched between the first underlay-substrate and the quantum-dot color filter, and the optical film layer has filtering functions.

6. The liquid crystal display device of claim 5, wherein the optical film layer is formed by a patterning process, and the optical film layer is used for removing an unconverted back light which is formed by a light emitted by the backlight module irradiating through the quantum-dot color resist unit.

7. The liquid crystal display device of claim 1, wherein the first substrate further comprises an upper polarizing sheet which is disposed on a surface of the encapsulation layer near the liquid crystal layer.

8. The liquid crystal display device of claim 1, wherein the first underlay-substrate is a glass substrate, a PI substrate, or a PET substrate.

9. A liquid crystal display device, comprising a liquid crystal panel and a backlight module disposed under the liquid crystal panel, wherein the liquid crystal panel comprises a first substrate, a second substrate, and a liquid crystal layer sandwiched between the first substrate and the second substrate, and the first substrate and the second substrate are correspondingly arranged and opposite to each other;

wherein the first substrate comprises a first underlay-substrate, a quantum-dot color filter, and an encapsulation layer, and the quantum-dot color filter and the encapsulation layer are sequentially disposed on a surface of the first underlay-substrate that is near the liquid crystal layer from top to bottom;

wherein the quantum-dot color filter comprises a pixel separation layer and a plurality of color resist units which are arranged in an array, and the pixel separation layer separates the color resist units;

wherein the color resist units comprise a first color resist unit, a second color resist unit, and a third color resist unit;

wherein at least one of the first color resist unit, the second color resist unit, and the third color resist unit is a quantum-dot color resist unit, and a transparent stacked layer is further sandwiched between the quantum-dot color resist unit and the encapsulation layer in the quantum-dot color filter, wherein a lower surface of the quantum-dot color resist unit is spaced farther away from the encapsulation layer than a lower surface of the pixel separation layer;

wherein the pixel separation layer and the transparent stacked layer are disposed on a surface of the encapsulation layer that defines a common plane to both the pixel separation layer and the transparent stacked layer, wherein the transparent stacked layer has a lower surface located on and in direct contact with the surface of the encapsulation layer and the lower surface of the transparent stacked layer and the lower surface of the pixel separation layer are both on the common plane;

wherein a sum of a height of the quantum-dot color resist unit and a height of the transparent stacked layer is less than a height of the pixel separation layer, such that an upper surface of the pixel separation layer is spaced farther away from the surface of the encapsulation layer than an upper surface of the quantum-dot color resist unit, and wherein the pixel separation layer is made of a light-shading material that provides a light-shading surface around the quantum-dot color resist unit in such a way that the light-shading surface extends beyond the upper surface of the quantum-dot color resist unit in a direction away from the encapsulation layer, and the light-shading surface also extends beyond the lower surface of the quantum-dot color resist unit in a direction toward the encapsulation layer to circumferentially surround the transparent stacked layer that is stacked between the encapsulation layer and the quantum-dot color resist unit;

wherein the at least one of the first color resist unit, the second color resist unit, and the third color resist unit that is a quantum-dot color resist unit comprises the first color resist unit that is a red quantum-dot color resist unit and the second color resist unit that is a green quantum-dot color resist unit, and wherein the third color resist unit is a blue color resist unit;

wherein the first substrate further comprises an optical film layer sandwiched between the first underlay-substrate and the quantum-dot color filter, and the optical film layer has filtering functions; and wherein the optical film layer is formed by a patterning process, and the optical film layer is used for removing an unconverted back light which is formed by a light emitted by the backlight module irradiating through the quantum-dot color resist unit.

10. The liquid crystal display device of claim 9, wherein the backlight module is a blue fluorescent light source.

11. The liquid crystal display device of claim 10, wherein the red quantum-dot color resist unit and the green quantum-dot color resist unit are formed by an ink-jet printing process with a red quantum-dot ink material and a green quantum-dot ink material, respectively; the blue color resist unit is formed by a transparent organic material.

12. The liquid crystal display device of claim 9, wherein the first substrate further comprises an upper polarizing sheet which is disposed on a surface of the encapsulation layer near the liquid crystal layer.

13. The liquid crystal display device of claim 9, wherein the first underlay-substrate is a glass substrate, a PI substrate, or a PET substrate.

* * * * *